United States Patent [19]
Featherston et al.

[11] Patent Number: 5,898,170
[45] Date of Patent: Apr. 27, 1999

[54] APPARATUS AND METHOD FOR FINDING OPTIMAL SENSITIVITY LEVEL FOR OPTICAL ENCODING CIRCUIT

[75] Inventors: Lord Nigel Featherston; Victor Paul Drake, both of Redmond, Wash.

[73] Assignee: Microsoft Corporation, Redmond, Wash.

[21] Appl. No.: 08/887,402

[22] Filed: Jul. 2, 1997

[51] Int. Cl.$^6$ ........................................................ G01D 5/34
[52] U.S. Cl. ...................... 250/231.18; 250/221; 345/165
[58] Field of Search ........................ 250/231.18, 231.16, 250/221; 345/165, 157, 161, 163, 164, 166, 167

[56] References Cited

U.S. PATENT DOCUMENTS 5,288,993   2/1994   Bidiville et al. ........................ 250/221

*Primary Examiner*—Que T. Le
*Attorney, Agent, or Firm*—Klarquist Sparkman Campbell Leigh & Whinston, LLP

[57] ABSTRACT

An apparatus and method for setting a sensitivity level of an optical encoding circuit in an input device includes an adjuster for adjusting the sensitivity level, a threshold locator for detecting a sensitivity threshold of the occurrence of a prescribed output from a light detector circuit, and a motion encoder for encoding motion from the output of the light detector circuit. The threshold locator locates a sensitivity threshold by setting the sensitivity level to one extreme, then repeatedly sampling the light detector circuit output for a prescribed state most likely at the one extreme, while incrementally changing the sensitivity level each time the prescribed state is detected. The sensitivity level used by the threshold locator thus approaches the sensitivity threshold of the prescribed state. A sensitivity level for motion encoding is set based on the sensitivity level for threshold location. Motion encoding samples from the output of the light detector may be interleaved with threshold location samples, and the absolute total motion is tracked. When the sensitivity level has not changed through a prescribed amount of total motion, the threshold location process terminates, the sensitivity level is set for motion encoding, all samples are used for motion encoding, and encoded motion is reported by the device. The prescribed amount of total motion is selected such that the threshold location process completes within a finite displacement, with an optimal-level resulting set point for motion encoding, regardless of the motion of the device throughout the process.

26 Claims, 3 Drawing Sheets

APPARATUS AND METHOD FOR FINDING OPTIMAL SENSITIVITY LEVEL FOR OPTICAL ENCODING CIRCUIT

FIELD OF THE INVENTION

This invention relates to apparatus and methods for adjusting the operating sensitivity of optical encoding circuits used for optical encoding in input devices such as mice and trackballs, to compensate for sensitivity variations in light source/light sensor pairs used in the circuits. The invention relates particularly to apparatus and methods for automatically and quickly adjusting the sensitivity of such circuits to optimal levels, even where the circuit may be inoperative for optical encoding at the initial sensitivity level of the circuit.

BACKGROUND AND SUMMARY OF THE INVENTION

Optical encoding is widely used in electronic input devices such as mice and trackballs. Standard optical encoding techniques employ a rotatable encoding wheel having light-blocking regions alternating circumferentially with light-transmitting regions at an edge portion of the wheel. The encoding wheel is mounted with its edge portion positioned between a light source, typically a light emitting diode (LED), and a light sensor, typically a phototransistor (PTR). As the encoding wheel rotates, the amount of light reaching the light sensor from the light source varies periodically, producing a corresponding periodically-varying electrical signal from the light sensor.

Typically, two light sensors along with one or two light sources are employed with each encoding wheel. The light sensors are positioned, relative to the wheel and light sources, such that the periodic output of one of the light sensors is about 90° out of phase with the periodic output of the other of the light sensors (i.e., the periodic outputs of the two sensors are in quadrature). The two outputs are individually converted to one-bit binary digital signals by some form of single-bit analog-to-digital conversion. Together, the two converted outputs provide a four-state position indication, as illustrated in FIG. 1 (prior art), so that both displacement and direction of the encoding wheel may be sensed.

FIG. 1 shows a exemplary trace of the outputs 1 and 2 of two light sensors, as a function of the rotational position of an associated encoding wheel. When the outputs 1 and 2 are converted to discrete binary values at an optimal digitization threshold O, four output states result. The regions labeled I-IV represent the rotational position corresponding to each of the four output states. Region I corresponds to the 1,1 state, (i.e., the state in which the converted outputs 1, 2, converted to single-bit binary, yield the values 1, 1, respectively). Similarly, region II corresponds to the 1,0 state, region III to the 0,0 state, and region IV to the 0,1 state.

Variability in the brightness of light sources and in the sensitivity of light sensors causes difficulties in the design and manufacture of optical encoders. High-volume, low-cost LEDs and PTRs exhibit a wide range of variability in performance characteristics. The ability of an optical encoder in an input device to tolerate variation in the LED/PTR pairs thus directly impacts the cost and manufacturing viability of the input device.

To reduce the effects of the wide range of inherent variation in LED and PTR performance, LEDs and PTRs are typically sorted into bins according to their brightness or sensitivity. This "binning" allows designers to specify brighter LEDs for pairing with less sensitive PTRs, thus reducing the total range of variation that would result from random pairing.

Typical optical encoder designs have some degree of adaptability, i.e., the sensitivity level or "gain" of the encoding circuits is adjustable within a certain range, so that a certain range of LED/PTR pairs may be used. Adjusting the sensitivity level of the encoding circuits has the effect of adjusting the amplitude and position of the output curves 1, 2 shown in FIG. 1 relative to the digitization threshold for conversion to binary. The digitization threshold is desirably set at the optimal level O shown in FIG. 1. Any other position changes the relative sizes of the regions I-IV corresponding to the areas of the four output states.

The range of LED/PTR pairs usable with a typical optical encoder design is specified such that the encoder has at least some ability to encode at startup i.e., the digitization threshold at startup of the device must be within (typically well within) the boundaries B shown in FIG. 1, so that motion may be encoded at least to some degree. The sensitivity of the encoding circuits is then adjusted, while motion is being encoded, to optimal levels, bringing the digitization threshold for conversion to digital output close to the optimal digitization threshold O. Even with some adaptability and the use of matched LED/PTR pairs, the total variation in the response of the LED/PTR pairs is great enough that only a relatively few of the possible bin combinations are usable in a typical optical encoder design, resulting in many unusable LEDs and PTRs in a standard high-volume production lot.

In order to utilize more of the total production of LEDs and PTRs, an optical encoder design with greater than standard adaptability can be used, but an apparatus and method is then required to properly set the sensitivity level of the encoding circuits to match the LED/PTR pairs employed. The apparatus and method must be able to locate the proper sensitivity level even though the encoder may not function to encode motion at all until after the sensitivity approaches the proper level. To support such applications as plug-and-play mice and trackballs, the apparatus and method should also be able to determine the proper sensitivity level even when the encoding wheel is in already in motion upon power-up.

The present invention achieves these and other advantages by use of a sensitivity threshold locator that detects the sensitivity threshold (maximum and/or minimum) at which a particular prescribed digital output state (or states) of the light detector output(s) occurs. The correct sensitivity level for motion encoding is then chosen as a function of the detected threshold(s). The sensitivity threshold locator may be implemented wholly in hardware or in a mixture of hardware and software or firmware. The sensitivity threshold locator detects a sensitivity threshold by sampling the digitally converted outputs of the light detectors to check for a prescribed output state, while varying the sensitivity level of the encoding circuits. The sensitivity level is set to one extreme of the sensitivity level range, after which the sensitivity threshold locator repeatedly checks for the existence of the prescribed digital output state. A state which is most probable at the one extreme is chosen as the prescribed state. Each time the prescribed state is detected, the sensitivity level is incremented (or decremented) away from the extreme, to a new sensitivity level at which the prescribed state is less (or, at most, equally) likely to occur. Thus the sensitivity level used by the sensitivity threshold locator will approach the limit at which the prescribed output state will not occur. The sensitivity threshold locator thus effectively detects the sensitivity threshold of the prescribed output state.

The prescribed output state may be the 1,1 state of a quadrature-related pair of light detectors, and the sensitivity level for each pair may be adjusted in unison. Alternatively, the prescribed output state may be the 1 (or 0) state of the binary-converted output of a single light detector, and the sensitivity level for each light detector may be adjusted together or individually, as desired. Other appropriate prescribed output states may be chosen, for example, the (0,0) state, the non-(0,0) state, or the non-(1,1) state, of a quadrature-related pair.

The correct sensitivity level for optical encoding (i.e., for motion encoding) is determined as a function of the sensitivity threshold(s) detected by the sensitivity threshold locator. The optimal motion encoding sensitivity level may be determined as linear function of the detected sensitivity threshold, and may be set by a processor operation, by a look-up table, or by other suitable means.

Sampling for locating the sensitivity threshold(s) of the prescribed output state(s) may be interleaved with sampling for motion encoding. Each new sensitivity level used for threshold location is also used to set a new sensitivity level for motion encoding. The total (absolute) motion detected during the threshold location process may be used to determine the end of the threshold location process. When no new threshold is located through a prescribed amount of total absolute motion, the threshold location process terminates, the sensitivity level is fixed at the proper level for motion encoding, and all further samples from the light detectors are used for motion encoding, with the resulting encoded motion being reported out as motion by the input device. (Motion encoded during threshold location is optionally not reported out as motion by the input device, since only half the sampling rate of the sampling circuit is used to encode such motion, increasing the possibly of aliasing.)

Using the total encoded motion of the encoding wheel to terminate the threshold location process, upon reaching a properly chosen prescribed amount of absolute total motion, statistically guarantees that the threshold location process will terminate within an acceptably short amount of motion, and at a sensitivity level adequately close to the actual sensitivity threshold.

The interleaving, during threshold location, of the sampling for threshold location with the sampling for motion encoding increases the possibility of aliasing in motion encoding. Also, motion of the encoder wheel during threshold location may be confined to small displacements, oscillatory in nature, depending upon the motion of the wheel caused by a user. To allow proper termination of threshold location under these circumstances, the total absolute motion is summed during threshold location, so that termination of threshold location will occur only after sufficient absolute motion to guarantee statistically that adequate sampling to find the threshold(s) has occurred. To prevent premature termination of threshold location due to possible jittering between adjacent states, the total motion is not incremented (or is decremented) upon a detected incremental position change indicating a change of direction.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

The present invention is directed toward an apparatus and method and for finding the optimal sensitivity level for optical encoder circuits, where the performance of the light source/light detector pair used in the circuits is widely variable such that functionality of the circuit for encoding motion cannot be guaranteed at a single initial sensitivity level.

Figure 2:
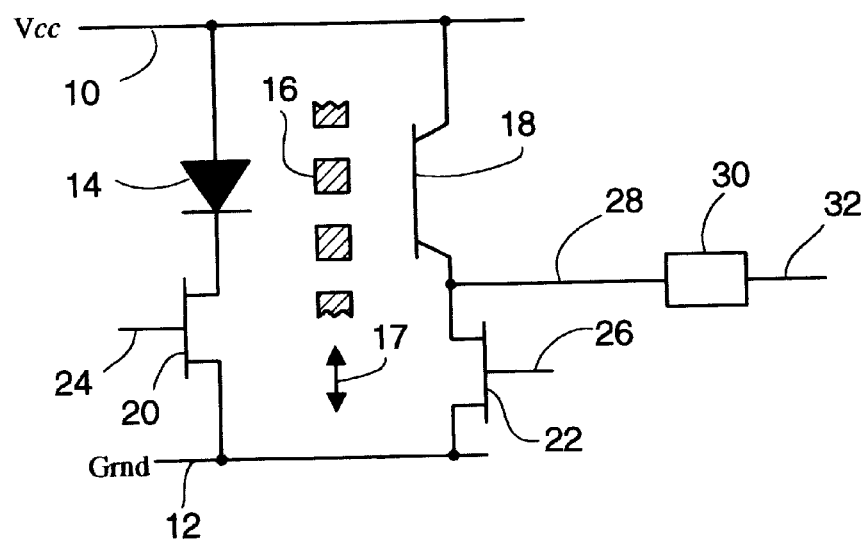
FIG. 2 (prior art) is a schematic diagram of some elements of an embodiment of a light sensor and related circuitry employable in and with the present invention.

An embodiment of certain prior-art circuit elements useful in or with the present invention is shown in FIG. 2 (prior art). A light source in the form of a light-emitting diode 14 is located near a light sensor in the form of a phototransistor 18. An optical encoding wheel 16 having light-blocking regions such as teeth alternating circumferentially with light-transmitting regions such as gaps between the teeth is mounted rotatably between the LED 14 and the PTR 18, with rotation allowing the teeth to move in the direction of the arrow 17. As the encoding wheel tuns, the light reaching the PTR 18 from the LED 14 varies periodically, resulting in a periodic variation of the voltage on the output line 28, the output line of the light sensor in the form of PTR 18. The output line 28 is converted to digital output on digital output line 32 by the analog to digital converter 30, which in a preferred embodiment is a simple digital input with a small amount of hysteresis. A comparator with a fixed or a programmable reference voltage input could also be used.

A wide range of sensitivity level adjustment is provided in the circuit elements of FIG. 2 (prior art) by two four-bit digital-to-analog converter current sources (current DACs) 20 and 22. Used in the traditional location of load resistors, these variable current sources provide improved performance by presenting a large input impedance to the PTR and providing a means to adjust the performance of the LED and the PTR as needed for a given LED/PTR pair. The current sources 20, 22 provide a wide range of sensitivity adjustment in the circuit to compensate for the range of possible variation in the LED/PTR pair 14, 18. Four-bit indexes are provided on lines 24 and 26, giving a total of 16 different current settings at each current source. For the highest circuit sensitivity, for example, current source 22 is set to the lowest current level, while current source 20 is set to the highest current level, thus enabling the circuit to function with the least sensitive LED/PTR pair. For a second PTR of a quadrature-related pair of PTRs, the circuit elements on the right half of FIG. 2 would all be repeated, but such doubling is omitted in FIG. 2 for clarity of illustration.

A commercially available optical encoder controller chip embodying current sources 20 and 22 is the CY7C63001 manufactured by Cypress Semiconductor Corporation, 3901 North First Street, San Jose, Calif. U.S.A.

The apparatus and methods of the present invention are useful in any optical encoding environment where wide sensitivity variation is available. Suitable means other than current sources may be used to provide the desired adjustable variation in the sensitivity of an optical encoding circuit, for example, variable resistances may be used in place of the current sources, and/or variable reference voltages may be used for analog-to-digital conversion.

The essential purpose of the sensitivity adjustment apparatus and method of the present invention is to set the adjustable elements of an optical encoding circuit to the proper sensitivity level such that 1s and 0s are generally present in the digitally converted output of the light sensors for the same length of encoder-wheel motion. In other words, the purpose is to set the amplitude and position of the periodic output of the light detectors relative to the effective digitization threshold (for division between 0 and 1) at the location represented in FIG. 1. The output 1 in FIG. 1 may represent the output on output line 28 of FIG. 2, with output 2 of FIG. 1 being the output of a PTR, not shown in FIG. 2, in quadrature with PTR 18. While the actual waveform produced by PTR 18 in the circuit of FIG. 2 is generally much more square (unless the LED/PTR pair is fairly insensitive) FIG. 1 serves for purposes of illustration. Whether the digitization threshold itself is moved, such as when a threshold for analog-to-digital conversion is adjusted, or the level of outputs 1 and 2 is moved with respect to a fixed digitization threshold as in a preferred embodiment, the effect is the same and will be described herein as adjusting the relative levels of a light detector output and a digitization threshold of an analog-to-digital converter, or as adjusting the sensitivity level of a light detector circuit.

Figure 1:
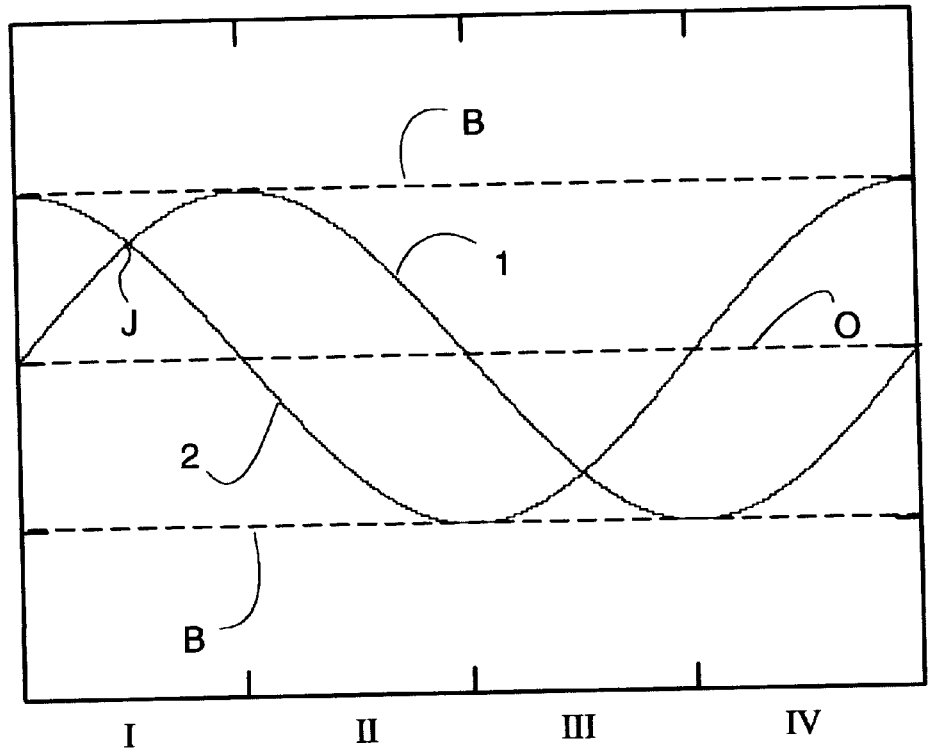
FIG. 1 (prior art) is an exemplary tracing of outputs of a quadrature-related pair of light sensors, as a function of the rotational position of an associated optical encoding wheel.
Figure 3:
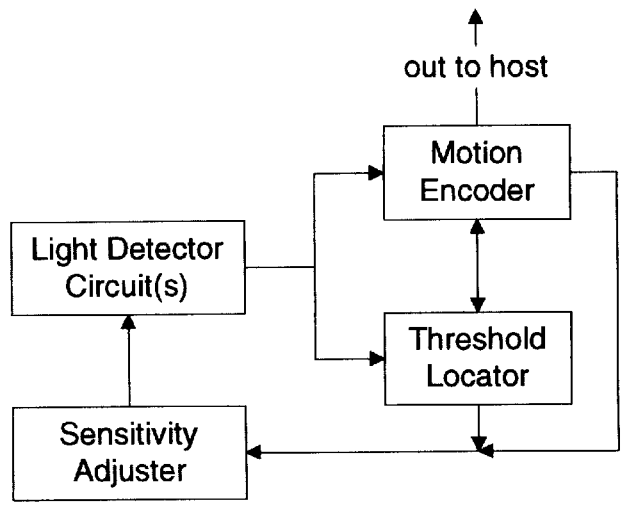
FIG. 3 is a diagram illustrating the relation of certain elements of an embodiment of the present invention.

According to the present invention, the proper adjustment of the sensitivity level of an adjustable optical encoder circuit such as that shown in FIG. 2 is accomplished by the functional elements shown in FIG. 3. The light detector circuit(s) of the optical encoder circuit are acted upon by a sensitivity adjuster to alter the sensitivity of the light detector circuits. A threshold locator and a motion encoder are both connected to the output(s) of the light detector circuits for sampling the output(s) of the light detector circuits. Both are also connected to the sensitivity adjuster for adjusting the sensitivity as needed. The sampling by the motion encoder and the threshold locator occurs in alternating, interleaved fashion. The threshold locator uses the samples from the light detector circuits, in conjunction with adjustments of sensitivity, to detect a sensitivity threshold or thresholds of prescribed output state(s) of the light detector circuits. With reference to FIG. 1, for example, such a threshold could be the maximum sensitivity at which output 1, output 2, or both, do not produce a 1 state. More than one threshold may be used, if desired.

A sensitivity level is assigned for motion encoding as a function of the level of the threshold(s) located by the threshold locator. The located threshold(s) are indicative of the performance of the LED/PTR pair. In a preferred embodiment, the function is a fixed factor applied to the value of a single detected threshold. The optimal sensitivity level for motion encoding may also be determined from any of various detected thresholds and may be set by operation of a linear function, or by a look-up table, or by other appropriate means. In a preferred embodiment, the lowest sensitivity level of the 1,1 output state (i.e., the highest sensitivity level at which no 1,1 state occurs) is the detected threshold, and the sensitivity level for motion encoding is set as a linear function of the detected threshold. Various other processes are possible, however. For example, if both the upper and lower sensitivity thresholds of output 1 in FIG. 1 were located by the threshold locator, the sensitivity level or effective digitization threshold for motion encoding could be set to mid-way between the two located thresholds.

Figure 4:
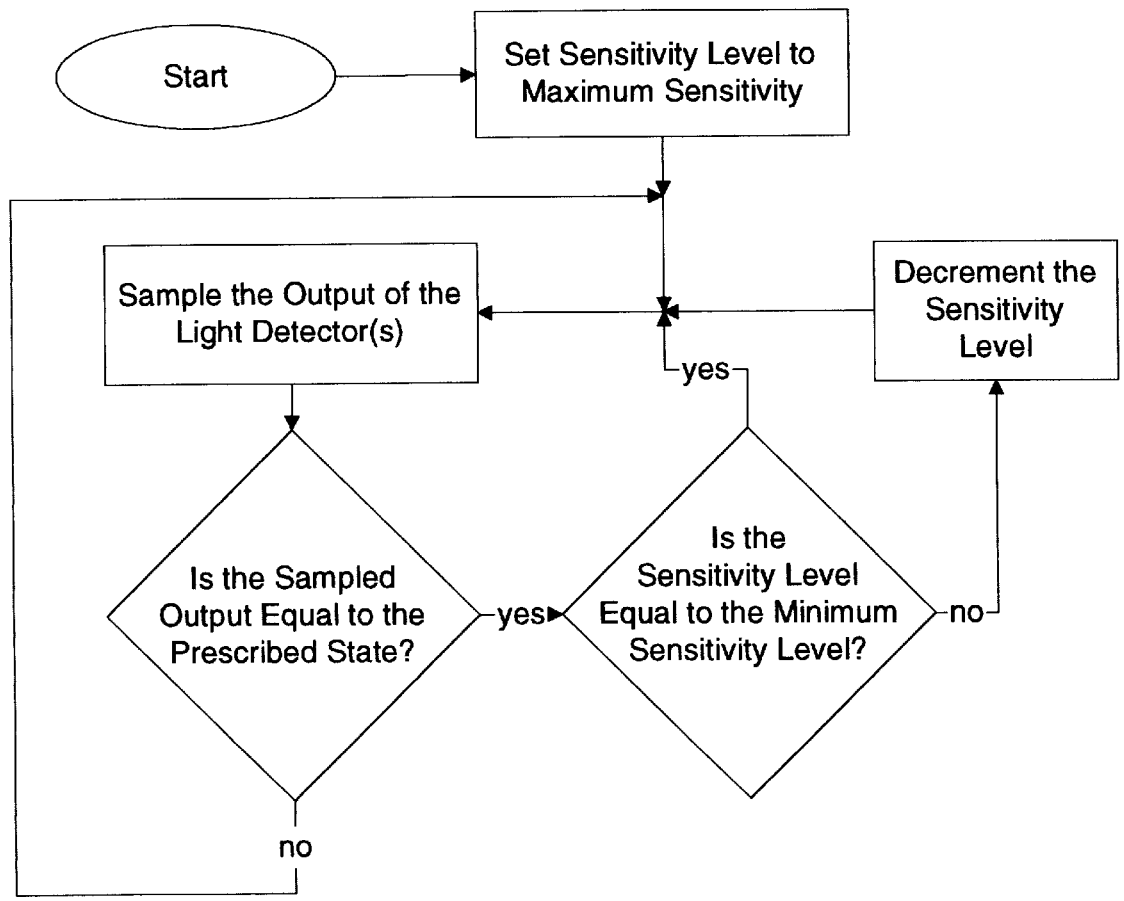
FIG. 4 is a flow chart of an embodiment of a method of the present invention.

The general method of threshold location preferably employed by the threshold locator of FIG. 3 is illustrated in the flow chart in FIG. 4. First, the sensitivity level is set to one extreme (in a preferred embodiment, the maximum sensitivity level), then the output of the light detector circuits is repeatedly sampled and tested for equality to a prescribed state. The prescribed state may be selected as desired from states whose probability is highest at the starting extreme sensitivity level. Each time the prescribed state is detected, the sensitivity level is decremented a small amount, which decreases the probability of the prescribed state being detected in subsequent samples. Such repeated sampling causes the sensitivity level to eventually approximate a sensitivity level at which the prescribed state will no longer occur, i.e., a sensitivity threshold of the prescribed state.

The threshold location is easily performed by testing for digital prescribed states. If the prescribed state is a logical 1 resulting from output 1 of FIG. 1, for example, the starting sensitivity level, being the highest possible sensitivity, would tend to raise the output 1 relative to the digitization threshold, thus putting the effective digitization threshold as low as possible. Each time a logical 1 is detected, the sensitivity level is decremented, increasing the effective digitization threshold slightly. Eventually, the effective digitization threshold level reaches the upper boundary B in FIG. 1. This is the digitization threshold or sensitivity level at which the prescribed state (logical 1 on output 1) will no longer occur, i.e., the sensitivity threshold of the 1 state. If desired, outputs of individual light sensors such as outputs 1 and 2 may each be tested in this fashion and the associated sensitivity levels for motion encoding may be individually set for each light sensor.

In a preferred embodiment, however, digital outputs of two quadrature-related light sensors are tested simultaneously as a two-bit prescribed digital output state, and the sensitivity levels for motion encoding are adjusted in unison. For example, the 1,1 state of outputs 1 and 2 of FIG. 1 may be used as the prescribed state. The sensitivity at the start is set to maximum. Each time a 1,1 state is found upon sampling, the sensitivity level is decremented, raising the effective digitization threshold. Eventually the effective digitization threshold reaches the junction J in FIG. 1, above which no 1,1 state will occur. The effective sensitivity level or digitization threshold or for motion encoding, optimally at O, is then set as a function of the sensitivity threshold found at J. The sensitivity threshold at junction J, the minimum sensitivity level of the 1,1 state (or the maximum sensitivity level at which no 1,1, state occurs), has been found to be a relatively stable point for purposes of threshold location, and the relation of its level to the optimum digitization threshold for motion encoding is generally linear. Of course the 0,0 state could be used in similar fashion, but the (0,0 ) state limit appears in testing to be less stable than the (1,1) state limit.

In a preferred embodiment of the present invention, samples for threshold location are interleaved with samples for motion encoding during the threshold location process. Motion detected during threshold location may or may not be reported as motion by the input device, as desired, but such motion is used to terminate the threshold location process as follows: The absolute total motion detected during threshold location is tracked, and is reset to zero each time a new threshold level is set. After a prescribed amount of total motion without any change in the threshold level, the threshold location is complete, the sensitivity level is set to the level for motion encoding, and every sample is used for motion encoding, with the input device reporting out to the host device any motion encoded.

Figure 5:
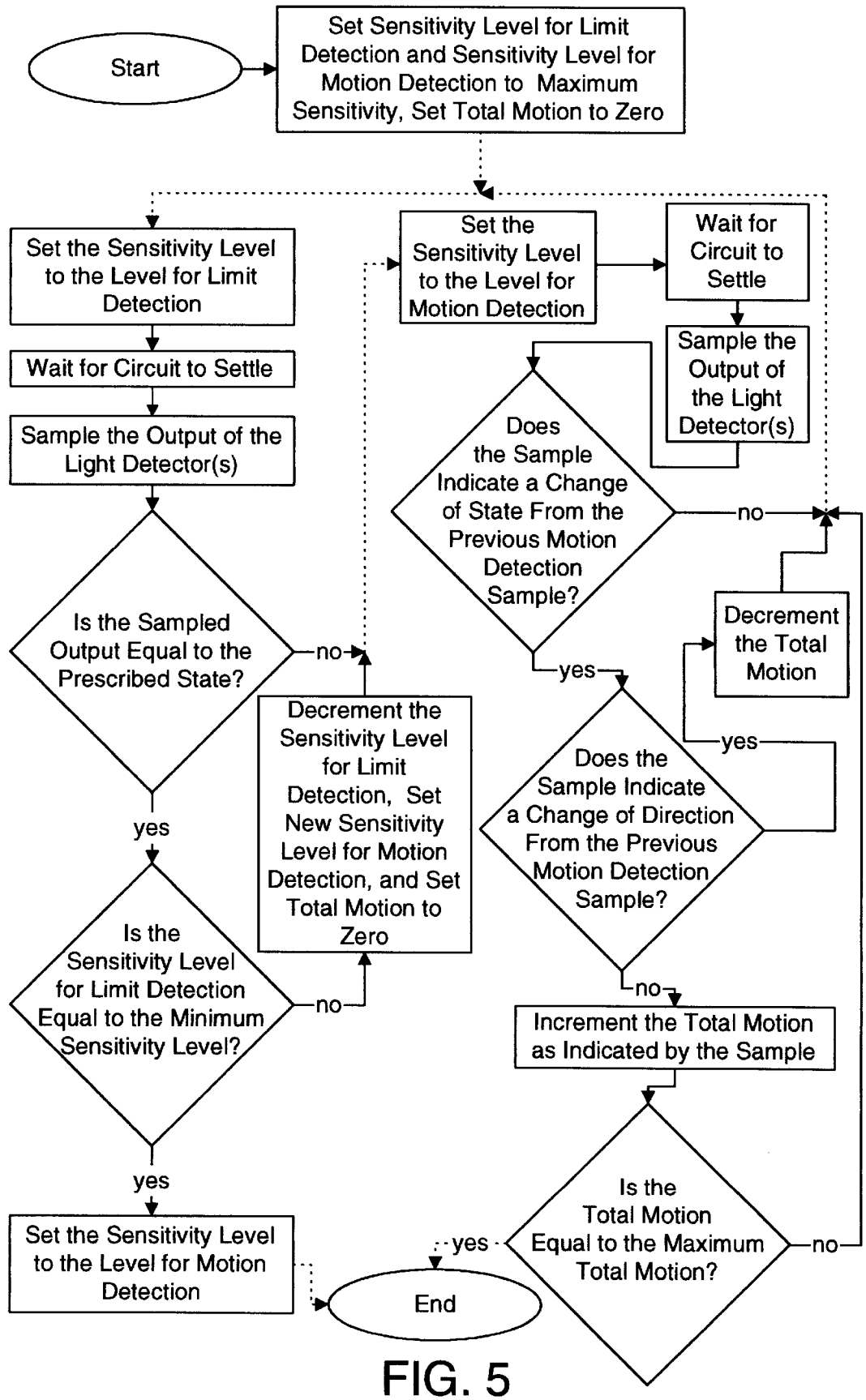
FIG. 5 is a flow chart of an embodiment of a method of the present invention.

A flowchart presenting the above process in greater detail is shown in FIG. 5. The process flow of FIG. 5 is exemplary and illustrative only, and other steps may be substituted or interleaved as needed or desired. For example, during the wait steps in each branch, other steps would typically be performed, such as setting threshold location and/or motion encoding sensitivity levels in LED/PTR pairs associated with additional encoder wheels.

The goal of the process shown in FIG. 5 is to set the sensitivity level of the optical encoding circuitry to a reasonably optimal level within a reasonably short amount of total motion. As an initialization, the sensitivity level for threshold location and the sensitivity level for motion encoding are both set to the maximum sensitivity level, and the total motion counter is set to zero.

The process then continues with the threshold location portion of the process, by setting the circuit's sensitivity level to the sensitivity level for threshold location. After an appropriate settling time, the output of the light detector(s) is then sampled and tested for equality with the prescribed state. If the sampled state is not equal to the prescribed state, the threshold location portion ends and returns to the motion encoding portion. If the sampled state is equal to the prescribed state, then the sensitivity level for threshold location is compared to the minimum sensitivity level. If these are identical, then the lowest possible sensitivity level for threshold location has been reached, and the entire process is terminated, after setting the sensitivity level to the level for motion encoding.

If the sensitivity level for threshold location is not identical to the lowest possible sensitivity level, the sensitivity level for threshold location is decremented, a new sensitivity level for motion encoding is set as a function of the new (decremented) sensitivity level for threshold location, the total motion counter is set to zero, and the threshold location portion of the process ends and returns to the motion encoding portion of the process.

In the motion encoding portion of the process, first, the sensitivity level is set to the sensitivity level for motion encoding. After an appropriate wait, the output of the light detectors is then sampled, and the sample is tested to see whether a change of state has occurred as compared to the last motion encoding sample. If so, then the sample is tested for a change of direction. If a change of direction is indicated, the total motion counter is decremented. Alternatively, the total motion counter could simply not be incremented when a change of direction is indicated. In either case, any jittering between adjacent states is not counted as motion, which might otherwise prematurely terminate the process. (Decrementing the total motion counter provides extra insurance against premature termination due to jitter or aliasing.) The motion encoding portion of the process then ends, and flow returns to the threshold location portion of the process.

If a change of state has been detected as compared to the last motion encoding sample and no change of direction is indicated, the total motion counter is incremented by the amount indicated by the sample, and the total motion is compared to the prescribed or maximum allowed total motion. If the total motion is equal to (or greater than) the prescribed total motion, the process terminates, otherwise, the motion encoding portion of the process ends and returns the flow to the threshold location portion of the process.

At termination of the process, the proper sensitivity level for motion encoding has been set, and all samples of the light detector output(s) are then used for motion encoding, with the encoded motion being reported out by the input device.

The prescribed total motion is chosen to statistically guarantee termination of the process only after the sensitivity threshold of the prescribed state used for threshold location has been approached sufficiently closely to ensure proper functioning of the resulting sensitivity level for motion encoding. Using a properly chosen prescribed total motion to terminate the process ensures that a sample of adequate size and cross-section has been taken in the threshold location process. (Adequate sample cross-section is also assured by the inherent inability of a user to maintain a perfectly constant speed of the encoder wheel, which could otherwise could cause a biased sample due to synchronization of the sample rate and the waveform of the periodic output of the light detectors.) Using a prescribed total motion to terminate the process also prevents the process from looping endlessly (unless the encoder wheel is never moved, i.e., the device is never used, in which case the endless loop causes no problems).

Preliminary tests of a process implemented in the form shown in FIG. 5 show that threshold location, particularly when the encoder wheel starts from rest, is completed is such a short time as to be unnoticeable to a user. Threshold location in this form could thus be implemented, essentially transparent to a user, at every full stop of a mouse or similar device. The method guarantees that the search for a sensitivity level for motion encoding will complete within a finite (and relatively short) amount of displacement of the encoder wheel(s), and result in an optimal sensitivity level for motion encoding, regardless of the type of motion that occurs during the search process.

With the method properly implemented, the probability of detecting the prescribed output state, at a given sensitivity level for threshold location, is inversely proportional to the probability of being able to successfully and accurately encode motion at the associated sensitivity level for motion encoding. Once the probability of detecting the prescribed output state is sufficiently small, the probability of being able to successfully and accurately encode motion reaches 100%.

As an alternative embodiment, the sensitivity level for motion encoding can potentially be the same as the sensitivity level for threshold location, if a suitable offset independent of the sensitivity level adjustment is provided. For example, analog-to-digital conversion with different fixed digitization thresholds could be performed for motion encoding and threshold location. The threshold locator would sample at one digitization threshold level, while the motion detector would sample at the other. With a properly chosen difference in the digitization thresholds, the same sensitivity level could potentially be used for both threshold location and motion encoding.

As another alternative, the threshold location process can run continuously, without termination. If sampling for threshold location and motion encoding is performed in parallel, the threshold locator may operate continuously, in parallel to the motion encoder, adjusting the sensitivity level for motion encoding whenever a prescribed state is detected. The threshold location process could also run continuously even with interleaved sampling, if sampling rates are adequately high. In any threshold location process other than a continuous threshold location process, however, the total motion is preferably tracked and used as explained above to terminate the threshold location such that both premature termination and endless looping are avoided.

Having described and illustrated the principles of our invention with reference to illustrated embodiments, it will be recognized that the illustrated embodiments can be modified in arrangement and detail without departing from such principles. It should be understood that the apparatuses, processes, or methods described herein are not related or limited to any particular type of computer or electronic apparatus, unless indicated otherwise. Various types of general purpose or specialized microcontrollers and other components may be used with or perform operations in accordance with the teachings described herein. Elements of the illustrated embodiment described as software or firmware may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A user input device including an optical encoder apparatus comprising:

one or more light sources;

first and second light detectors positioned near the one or more light sources, each light detector providing an electrical output representative of the amount of light received by the light detector;

a rotatable encoder wheel having light-blocking regions alternating circumferentially with light-transmitting regions and positioned between the light detectors and the one or more light sources such that the amount of light received by the light detectors, and the output of the light detectors, varies periodically with the rotation of the encoder wheel, the light detectors being positioned relative to the encoder wheel and the one or more light sources such that the periodic output of the second light detector is about 90° out of phase with the periodic output of the first light detector;

first and second single-bit analog-to-digital converters connected respectively to the outputs of the first and second light detectors and converting the outputs to first and second single-bit digital outputs at a digitization threshold;

a sensitivity level adjuster for adjusting the relative levels of the output of the light detectors and the digitization threshold of the first and second analog-to-digital converters; and a threshold locator for locating the sensitivity threshold of a prescribed state of the first and second digital outputs; wherein the sensitivity level adjuster adjusts the relative levels of the output of the light detectors and the digitization threshold of the first and second analog-to-digital converters as a function of the sensitivity threshold detected by the threshold locator.

2. The device recited in claim 1 wherein the sensitivity level adjuster adjusts the relative level of the output of the light detectors by affecting both the light detectors and the one or more light sources.

3. The device recited in claim 1 wherein the sensitivity level adjuster comprises a variable resistance.

4. The device recited in claim 1 wherein the sensitivity level adjuster comprises a variable current source.

5. The device recited in claim 1 wherein the sensitivity level adjuster comprises a variable voltage source.

6. The device recited in claim 1 wherein the sensitivity level adjuster comprises first and second sensitivity level adjusters for adjusting, respectively, the effective output levels of the first and second light detectors, and wherein the threshold locator comprises a first threshold locator for detecting a sensitivity threshold of the output of the first light detector and a second threshold locator for detecting a sensitivity threshold of the output of the second light detector, and wherein the first sensitivity level adjuster adjusts the output of the first light detector to a level determined as a function of the sensitivity threshold detected by the first threshold locator, and the second sensitivity level adjuster adjusts the output of the second light detector to a level determined as a function of the sensitivity threshold detected by the second threshold locator.

7. The device recited in claim 6 wherein the sensitivity threshold which is detected by the first threshold locator is the maximum sensitivity level at which the periodic output of the first light detector produces no 1 states at the first digital output.

8. The device recited in claim 6 wherein the sensitivity threshold which is detected by the first threshold locator is the minimum sensitivity level at which the periodic output of the first light detector produces no 0 states at the first digital output.

9. The device recited in claim 6 wherein the first threshold locator detects first and second sensitivity thresholds, the first sensitivity threshold being the maximum sensitivity at which the periodic output of the first light detector produces no 1 states, the second sensitivity threshold being the minimum sensitivity level at which the periodic output of the first light detector produces no 0 states, and wherein the first sensitivity level adjuster adjusts the sensitivity level of the first light detector for motion encoding to between the levels of the first and second sensitivity thresholds.

10. The device recited in claim 1 wherein the sensitivity threshold which is detected by the threshold locator is the maximum sensitivity level at which the periodic output of the first light detector produces no 1 states at the first digital output.

11. The device recited in claim 1 wherein the sensitivity threshold which is detected by the threshold locator is the minimum sensitivity level at which the periodic output of the first light detector produces no 0 states at the first digital output.

12. The device recited in claim 1 wherein the threshold locator detects first and second sensitivity thresholds, the first sensitivity threshold being the maximum sensitivity at which the periodic output of the first light detector produces no 1 states, the second sensitivity threshold being the minimum sensitivity level at which the periodic output of the first light detector produces no 0 states, and wherein the sensitivity level adjuster adjusts the sensitivity level of the first light detector for motion encoding to between the levels of the first and second sensitivity thresholds.

13. The device recited in claim 1 wherein the threshold locator locates the maximum sensitivity at which no 1,1 state occurs at the first and second digital outputs.

14. The device recited in claim 1 wherein the threshold locator locates the minimum sensitivity at which no 0,0 state occurs at the first and second digital outputs.

15. The device recited in claim 1 wherein the sensitivity level adjuster comprises a variable current source coupled to each light detector and a variable current source coupled to each light source.

16. The device recited in claim 1 further including a motion encoder connected to the first and second analog-to-digital converters so as to sample the first and second digital outputs for encoding motion of the encoder wheel based on the first and second digital outputs.

17. The device recited in claim 16 further comprising third and fourth analog-to-digital converters connected respectively to the outputs of the first and second light detectors and converting the outputs of the first and second light detectors to third and fourth single-bit digital outputs, wherein the threshold locator is connected to the third and fourth analog-to-digital converters so as to sample the third and fourth digital outputs, the third and fourth analog-to-digital converters having a digitization threshold different from the digitization threshold of the first and second analog-to-digital converters.

18. The device recited in claim 17 wherein the motion encoder is adapted to sample the first and second digital outputs in parallel with the threshold locator sampling the third and fourth digital outputs.

19. The device recited in claim 16 wherein the threshold locator is connected to the first and second analog-to-digital converters, so as to sample the first and second digital outputs, the threshold locator being adapted to sample the first and second digital outputs alternatingly with the motion encoder sampling the first and second digital outputs, the sensitivity level of the first and second light detectors being adjusted by the sensitivity level adjuster to a motion encoding sensitivity level during sampling by the motion encoder, and to a threshold location sensitivity level, different from the motion encoding sensitivity level, during sampling by the threshold locator.

20. The device recited in claim 1 wherein the one or more light sources comprise light-emitting diodes and the light sensors comprise phototransistors.

21. A method for setting an adjustable sensitivity level of an optical encoding device having an optical encoding wheel and first and second digital outputs in quadrature representative of the rotational position of the optical encoding wheel, the adjustable sensitivity level compensating for variations in LED-phototransistor pairs used with the optical encoding wheel, the method comprising the steps of:

setting the adjustable sensitivity level to a first level at an extreme of the total range of the adjustable sensitivity level that yields the greatest probability of the outputs matching prescribed output values;

repeatedly sampling the outputs during motion of the encoding wheel to obtain search output values;

whenever the search output values match the prescribed output values, changing the adjustable sensitivity level to a new first level at a small change from the previous first level, the change being in the direction away from the extreme; the change yielding an equal or lessor probability of the outputs matching the prescribed output values.

22. The method recited in claim 21 further comprising the steps of:

totaling the absolute motion of the encoding wheel, whenever the search output values match prescribed output values, setting the total of the absolute motion of the encoding wheel to zero; and when the total of the absolute motion of the encoding wheel reaches a prescribed total motion value, ceasing to sample the outputs to obtain search output values.

23. The method recited in claim 22 wherein the step of totaling the absolute motion of the encoding wheel comprises sampling the two outputs respectively with two single-bit analog-to-digital converters with the sensitivity level set to a second level determined as a function of the first level, and wherein the step of sampling the outputs to obtain search output values comprises sampling the two outputs respectively with the two analog-to-digital converters with the sensitivity level set to the first level, the sampling at the second sensitivity level being interleaved with the sampling at the first sensitivity level.

24. The method of claim 23 further comprising the steps of:

selecting the prescribed total motion value such that when the total of the absolute motion reaches the prescribed total motion value, the second level, determined as a function of the first level, is within a range that ensures correct motion encoding by the optical encoding device; and setting the adjustable sensitivity level to the second level when the total of the absolute motion of the encoding wheel reaches the prescribed total motion value.

25. The method of claim 22 wherein the step of totaling the absolute motion of the encoding wheel includes the step of not including in the total motion each first increment of encoded motion corresponding to any change of direction of the encoding wheel.

26. The method of claim 22 wherein the step of totaling the absolute motion of the encoding wheel includes subtracting from the total motion one increment of motion for each detected change of direction of the encoding wheel.

* * * * *